United States Patent
Hansen

(10) Patent No.: US 9,932,168 B2
(45) Date of Patent: Apr. 3, 2018

(54) BEVERAGE DELIVERY POD AND METHODS OF USE AND MANUFACTURE

(75) Inventor: Nicholas Andrew Hansen, Banbury (GB)

(73) Assignee: Kraft Foods R & D, Inc., Deerfield, IL (US)

( * ) Notice: Subject to any disclaimer, the term of this patent is extended or adjusted under 35 U.S.C. 154(b) by 817 days.

(21) Appl. No.: 14/003,766

(22) PCT Filed: Mar. 8, 2012

(86) PCT No.: PCT/US2012/028185
§ 371 (c)(1),
(2), (4) Date: Oct. 24, 2013

(87) PCT Pub. No.: WO2012/122329
PCT Pub. Date: Sep. 13, 2012

(65) Prior Publication Data
US 2014/0037803 A1    Feb. 6, 2014

Related U.S. Application Data

(60) Provisional application No. 61/450,548, filed on Mar. 8, 2011.

(30) Foreign Application Priority Data

Mar. 8, 2011    (GB) .................................. 1103953.4

(51) Int. Cl.
| | | |
|---|---|---|
| B65D 85/804 | (2006.01) | |
| A47J 31/06 | (2006.01) | |
| B65D 65/46 | (2006.01) | |

(52) U.S. Cl.
CPC ...... B65D 85/8043 (2013.01); A47J 31/0642 (2013.01); A47J 31/0668 (2013.01);
(Continued)

(58) Field of Classification Search
CPC .................................................. B65D 85/8043
See application file for complete search history.

(56) References Cited

U.S. PATENT DOCUMENTS

| | | |
|---|---|---|
| 2,778,739 A | 1/1957 | Rodth |
| D190,530 S | 6/1961 | Bender et al. |

(Continued)

FOREIGN PATENT DOCUMENTS

| | | |
|---|---|---|
| CA | 2421128 | 9/2003 |
| CA | 2674483 | 7/2008 |

(Continued)

OTHER PUBLICATIONS

International Search Report dated May 22, 2012 in PCT/US2012/028185. (4 pgs.).

(Continued)

*Primary Examiner* — Erik Kashnikow
*Assistant Examiner* — Lela S. Williams
(74) *Attorney, Agent, or Firm* — Kraft Foods R & D, Inc.

(57) ABSTRACT

A pod containing one or more beverage ingredients is provided, where the pod comprises a generally rigid outer member (12) with an open top and an outlet opening in the bottom, with an internal filter (16) adjacent a bottom portion of the outer member, one or more beverage ingredients disposed above the filter, and a lid (14) closing the open top. The outer member has an outer peripheral sidewall (20) defining the open top and extending downwardly from the open top toward the bottom portion and inwardly converging toward the outlet opening. The bottom portion of the sidewall defines a plurality of ribs (36) extending inwardly in the interior of the outer member toward the outlet opening. Beverage outlet flow paths are disposed between adja- (Continued)

cent ribs and directed toward the outlet opening. The filter is supported above the outlet opening and the beverage outlet flow paths by the ribs.

16 Claims, 5 Drawing Sheets

(52) U.S. Cl.
CPC ...... *B65D 65/466* (2013.01); *B65D 2565/385* (2013.01); *Y02W 90/13* (2015.05)

(56) References Cited

U.S. PATENT DOCUMENTS

| | | |
|---|---|---|
| 3,070,275 A | 12/1962 | Bostrom |
| 3,083,101 A | 3/1963 | Noury |
| D195,004 S | 4/1963 | Eicholtz |
| D195,005 S | 4/1963 | Eicholtz |
| D197,313 S | 1/1964 | Wanderer |
| 3,292,527 A | 12/1966 | Stasse |
| 3,336,857 A | 8/1967 | Knodt et al. |
| 3,398,836 A | 8/1968 | Hugentobler |
| 3,403,617 A | 10/1968 | Lampe |
| 3,443,714 A | 5/1969 | Edwards |
| 3,443,715 A | 5/1969 | Edwards |
| 3,445,237 A | 5/1969 | Gidge |
| D216,870 S | 3/1970 | Gregor |
| D221,418 S | 8/1971 | Kinney |
| 3,607,297 A | 9/1971 | Fasano |
| 3,811,373 A | 5/1974 | Telco |
| 3,812,273 A | 5/1974 | Schmidt |
| 3,823,656 A | 7/1974 | Vanderveken |
| 3,833,740 A | 9/1974 | Schmidt |
| 3,878,772 A | 4/1975 | Nordskog |
| D235,246 S | 6/1975 | Evans et al. |
| 3,937,134 A | 2/1976 | Molenaar et al. |
| 3,971,305 A | 7/1976 | Daswick |
| D241,228 S | 8/1976 | Boduch |
| 4,075,107 A | 2/1978 | Smith |
| 4,094,234 A | 6/1978 | Olney et al. |
| D248,358 S | 7/1978 | Thomas |
| 4,098,177 A | 7/1978 | Olney et al. |
| 4,133,769 A | 1/1979 | Morgan, Jr. |
| 4,136,202 A | 1/1979 | Favre |
| D255,529 S | 6/1980 | Dziekonski |
| 4,206,694 A | 6/1980 | Moskowitz et al. |
| D260,243 S | 8/1981 | Dogliotti |
| 4,306,492 A | 12/1981 | Zimmermann |
| 4,321,139 A | 3/1982 | Auclair |
| 4,334,640 A | 6/1982 | van Overbruggen et al. |
| 4,362,623 A | 12/1982 | Holopainen |
| 4,382,402 A | 5/1983 | Alvarez |
| 4,417,504 A | 11/1983 | Yamamoto |
| 4,452,130 A | 6/1984 | Klein |
| D275,179 S | 8/1984 | Spencer et al. |
| 4,471,689 A | 9/1984 | Piana |
| 4,522,298 A | 6/1985 | Weinberger |
| 4,724,752 A | 2/1988 | Aliesch et al. |
| 4,738,378 A | 4/1988 | Oakley et al. |
| 4,775,048 A | 10/1988 | Baecchi et al. |
| 4,800,089 A | 1/1989 | Scott |
| 4,818,544 A | 4/1989 | Seward |
| 4,846,052 A | 7/1989 | Favre et al. |
| 4,853,234 A | 8/1989 | Bentley et al. |
| 4,859,337 A | 8/1989 | Woltermann |
| 4,867,993 A | 9/1989 | Nordskog |
| 4,873,915 A | 10/1989 | Newman et al. |
| 4,875,408 A | 10/1989 | McGee |
| 4,886,674 A | 12/1989 | Seward et al. |
| D306,928 S | 3/1990 | Hanna |
| D306,974 S | 4/1990 | Tholstrup |
| 4,920,870 A | 5/1990 | Newman et al. |
| 4,921,712 A | 5/1990 | Malmquist |
| 4,975,292 A | 12/1990 | Loizzi |
| 4,990,352 A | 2/1991 | Newman et al. |
| 5,043,172 A | 8/1991 | Loizzi |
| 5,072,660 A | 12/1991 | Helbling |
| 5,082,676 A | 1/1992 | Love et al. |
| 5,108,768 A | 4/1992 | So |
| 5,134,924 A | 8/1992 | Vicker |
| 5,150,645 A | 9/1992 | Schiettecatte |
| 5,178,058 A | 1/1993 | van Dort et al. |
| 5,197,374 A | 3/1993 | Fond |
| 5,242,702 A | 9/1993 | Fond |
| 5,243,164 A | 9/1993 | Erickson et al. |
| 5,259,295 A | 11/1993 | Timm |
| D342,447 S | 12/1993 | Aylward |
| 5,272,960 A | 12/1993 | Kinna |
| 5,279,442 A | 1/1994 | Jentzsch |
| 5,287,797 A | 2/1994 | Grykiewicz et al. |
| 5,298,267 A | 3/1994 | Gruenbacher |
| 5,325,765 A | 7/1994 | Sylvan et al. |
| 5,327,815 A | 7/1994 | Fond et al. |
| 5,343,799 A | 9/1994 | Fond |
| 5,347,916 A | 9/1994 | Fond et al. |
| 5,363,745 A | 11/1994 | Lin |
| 5,398,595 A | 3/1995 | Fond et al. |
| 5,398,596 A | 3/1995 | Fond |
| 5,424,083 A | 6/1995 | Lozito |
| 5,440,972 A | 8/1995 | English |
| 5,472,719 A | 12/1995 | Favre |
| 5,531,152 A | 7/1996 | Gardosi |
| 5,603,254 A | 2/1997 | Fond et al. |
| D379,287 S | 5/1997 | Carlson |
| 5,637,335 A | 6/1997 | Fond et al. |
| 5,638,741 A | 6/1997 | Cisaria |
| D381,558 S | 7/1997 | Schaefer et al. |
| 5,649,412 A | 7/1997 | Binacchi |
| 5,649,472 A | 7/1997 | Fond et al. |
| 5,656,311 A * | 8/1997 | Fond .................. B65D 85/8043 426/112 |
| 5,656,316 A | 8/1997 | Fond et al. |
| D394,005 S | 5/1998 | Marijnissen |
| 5,762,987 A | 6/1998 | Fond et al. |
| 5,776,527 A | 7/1998 | Blanc |
| 5,794,519 A | 8/1998 | Fischer |
| 5,826,492 A | 10/1998 | Fond et al. |
| 5,840,189 A | 11/1998 | Sylvan et al. |
| D408,679 S | 4/1999 | Potts et al. |
| 5,895,672 A | 4/1999 | Cooper |
| 5,897,899 A | 4/1999 | Fond |
| 5,899,137 A | 5/1999 | Miller et al. |
| 5,906,844 A | 5/1999 | Stahli et al. |
| 5,921,168 A | 7/1999 | Nello |
| 5,948,455 A | 9/1999 | Schaeffer et al. |
| 5,952,028 A | 9/1999 | Lesser |
| D415,024 S | 10/1999 | McCann |
| D415,025 S | 10/1999 | McCann |
| 5,974,950 A | 11/1999 | King |
| 6,009,792 A | 1/2000 | Kraan |
| D419,821 S | 2/2000 | Powell et al. |
| 6,021,705 A | 2/2000 | Dijs |
| 6,024,000 A | 2/2000 | Goldmann, II |
| 6,025,000 A | 2/2000 | Fond et al. |
| 6,062,127 A | 5/2000 | Klosinski et al. |
| 6,068,871 A | 5/2000 | Fond et al. |
| 6,079,315 A | 6/2000 | Beaulieu et al. |
| 6,082,247 A | 7/2000 | Beaulicu |
| D429,446 S | 8/2000 | Toussant et al. |
| 6,109,168 A | 8/2000 | Illy et al. |
| 6,117,471 A | 9/2000 | King |
| 6,142,063 A | 11/2000 | Beaulieu et al. |
| 6,170,386 B1 | 1/2001 | Paul |
| 6,182,554 B1 | 2/2001 | Beaulieu et al. |
| 6,186,051 B1 | 2/2001 | Aarts |
| 6,189,438 B1 | 2/2001 | Bielfeldt et al. |
| D438,794 S | 3/2001 | Miles et al. |
| 6,240,832 B1 | 6/2001 | Schmed et al. |
| 6,245,371 B1 | 6/2001 | Gutwein et al. |
| D445,674 S | 7/2001 | Pritchett |
| D445,677 S | 7/2001 | Lindsay et al. |
| 6,289,948 B1 | 9/2001 | Jeannin et al. |
| D450,240 S | 11/2001 | Haag et al. |
| D452,433 S | 12/2001 | Lazaris |

(56) References Cited

U.S. PATENT DOCUMENTS

| | | |
|---|---|---|
| D452,434 S | 12/2001 | Sweeney |
| 6,347,725 B1 | 2/2002 | Yoakim et al. |
| 6,358,545 B1 | 3/2002 | Chandler et al. |
| 6,405,637 B1 | 6/2002 | Cai |
| 6,440,256 B1 | 8/2002 | Gordon et al. |
| D462,865 S | 9/2002 | Honan et al. |
| D462,900 S | 9/2002 | Yamada et al. |
| D465,154 S | 11/2002 | Obrien |
| 6,499,388 B2 | 12/2002 | Schmed |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,612,224 B2 | 9/2003 | Mercier et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,666,130 B2 | 12/2003 | Taylor et al. |
| 6,672,200 B2 | 1/2004 | Duffy et al. |
| 6,698,228 B2 | 3/2004 | Kateman et al. |
| 6,698,333 B2 | 3/2004 | Halliday et al. |
| 6,708,600 B2 | 3/2004 | Winkler et al. |
| D489,215 S | 5/2004 | Honan et al. |
| 6,740,345 B2 | 5/2004 | Cai |
| 6,758,130 B2 | 7/2004 | Sargent et al. |
| 6,786,134 B2 | 9/2004 | Green |
| 6,786,136 B2 | 9/2004 | Cirigliano et al. |
| 6,810,788 B2 | 11/2004 | Hale |
| 6,832,542 B2 | 12/2004 | Hu et al. |
| 6,849,285 B2 | 2/2005 | Masek et al. |
| D502,362 S | 3/2005 | Lazaris et al. |
| D506,926 S | 7/2005 | Halliday et al. |
| 6,935,222 B2 | 8/2005 | Chen et al. |
| 6,941,855 B2 | 9/2005 | Denisart et al. |
| 6,948,420 B2 | 9/2005 | Kirschner et al. |
| D510,679 S | 10/2005 | Smith et al. |
| D513,152 S | 12/2005 | Cahen |
| D513,572 S | 1/2006 | Schaffeld et al. |
| D520,185 S | 5/2006 | Zeng et al. |
| 7,063,238 B2 | 6/2006 | Hale |
| 7,165,488 B2 | 1/2007 | Bragg et al. |
| D539,643 S | 4/2007 | Abel et al. |
| 7,213,506 B2 | 5/2007 | Halliday et al. |
| 7,219,598 B2 | 5/2007 | Halliday et al. |
| D544,299 S | 6/2007 | Schaffeld et al. |
| 7,243,598 B2 | 7/2007 | Halliday et al. |
| 7,255,039 B2 | 8/2007 | Halliday et al. |
| 7,287,461 B2 | 10/2007 | Halliday et al. |
| 7,308,851 B2 | 12/2007 | Halliday et al. |
| 7,322,277 B2 | 1/2008 | Halliday et al. |
| 7,325,479 B2 | 2/2008 | Laigneau et al. |
| 7,328,651 B2 | 2/2008 | Halliday et al. |
| 7,335,387 B2 | 2/2008 | Hayes et al. |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter et al. |
| 7,418,899 B2 | 9/2008 | Halliday et al. |
| 7,444,925 B2 | 11/2008 | Mahlich |
| 7,490,542 B2 | 2/2009 | Macchi et al. |
| 7,513,192 B2 | 4/2009 | Sullivan et al. |
| 7,523,695 B2 | 4/2009 | Streeter et al. |
| D592,529 S | 5/2009 | Friebe et al. |
| 7,533,603 B2 | 5/2009 | Halliday et al. |
| 7,533,604 B2 | 5/2009 | Halliday et al. |
| 7,552,672 B2 | 6/2009 | Schmed |
| 7,604,826 B2 | 10/2009 | Denisart et al. |
| D605,502 S | 12/2009 | Honda et al. |
| D606,363 S | 12/2009 | Aardenburg |
| 7,640,843 B2 | 1/2010 | Halliday et al. |
| 7,640,845 B2 | 1/2010 | Woodnorth et al. |
| 7,658,141 B2 | 2/2010 | Masek et al. |
| D621,698 S | 8/2010 | Cometto |
| 7,793,585 B2 | 9/2010 | Rasmussen et al. |
| 7,815,953 B2 | 10/2010 | Mastropasqua et al. |
| D628,476 S | 12/2010 | Vang |
| D628,883 S | 12/2010 | Stephens |
| 7,921,766 B2 | 4/2011 | Halliday et al. |
| D637,484 S | 5/2011 | Winkler |
| D638,290 S | 5/2011 | Cimmerer et al. |
| 7,947,316 B2 | 5/2011 | Kirschner |
| D640,100 S | 6/2011 | Shing |
| D640,547 S | 6/2011 | Guillemin et al. |
| D641,592 S | 7/2011 | Davis |
| D642,454 S | 8/2011 | Santoiemmo |
| D645,340 S | 9/2011 | Menard et al. |
| 8,025,210 B2 | 9/2011 | Johnson et al. |
| D647,398 S | 10/2011 | Winkler |
| D647,399 S | 10/2011 | Winkler |
| D649,870 S | 12/2011 | Cometto |
| 8,109,200 B2 | 2/2012 | Hansen |
| 8,151,694 B2 | 4/2012 | Jacobs et al. |
| D658,493 S | 5/2012 | Cometto |
| 8,168,247 B2 | 5/2012 | Halliday et al. |
| 8,307,754 B2 | 11/2012 | Ternite et al. |
| 8,361,527 B2 | 1/2013 | Winkler et al. |
| 8,425,964 B2 | 4/2013 | Doglioni Majer |
| D682,675 S | 5/2013 | Rapparini |
| D685,631 S | 7/2013 | Rapparini |
| D689,768 S | 9/2013 | Inderbitzin |
| D694,620 S | 12/2013 | Hansen |
| D695,111 S | 12/2013 | Hansen |
| D697,797 S | 1/2014 | Hansen |
| D708,057 S | 7/2014 | Hansen |
| 2001/0047724 A1 | 12/2001 | Lazaris et al. |
| 2001/0048957 A1 | 12/2001 | Lazaris et al. |
| 2002/0015768 A1 | 2/2002 | Masek et al. |
| 2002/0020659 A1 | 2/2002 | Sweeney et al. |
| 2002/0023543 A1 | 2/2002 | Schmed |
| 2002/0048621 A1 | 4/2002 | Boyd et al. |
| 2002/0078831 A1 | 6/2002 | Cai |
| 2002/0088807 A1 | 7/2002 | Perkovic et al. |
| 2002/0121197 A1 | 9/2002 | Mercier et al. |
| 2002/0121198 A1 | 9/2002 | Kollep et al. |
| 2002/0129712 A1 | 9/2002 | Westbrook et al. |
| 2002/0134249 A1 | 9/2002 | Melton |
| 2002/0144603 A1 | 10/2002 | Taylor |
| 2002/0144604 A1 | 10/2002 | Winkler et al. |
| 2002/0148356 A1 | 10/2002 | Lazaris et al. |
| 2002/0148357 A1 | 10/2002 | Lazaris et al. |
| 2002/0185010 A1 | 12/2002 | Spiteri |
| 2003/0005826 A1 | 1/2003 | Sargent et al. |
| 2003/0039731 A1 | 2/2003 | Dalton et al. |
| 2003/0056655 A1 | 3/2003 | Kollep et al. |
| 2003/0066431 A1 | 4/2003 | Fanzutti et al. |
| 2003/0145736 A1 | 8/2003 | Green |
| 2003/0172813 A1 | 9/2003 | Schifferle |
| 2003/0217643 A1 | 11/2003 | Masek et al. |
| 2003/0222089 A1 | 12/2003 | Hale |
| 2004/0045443 A1 | 3/2004 | Lazaris et al. |
| 2004/0163543 A1 | 8/2004 | Hu et al. |
| 2004/0228955 A1 | 11/2004 | Denisart et al. |
| 2005/0051478 A1 | 3/2005 | Karanikos et al. |
| 2005/0150390 A1 | 7/2005 | Schifferle |
| 2005/0172822 A1 | 8/2005 | Macchi et al. |
| 2005/0183581 A1 | 8/2005 | Kirschner et al. |
| 2005/0205601 A1 | 9/2005 | Taylor |
| 2005/0217213 A1 | 10/2005 | Lozinski et al. |
| 2005/0223904 A1 | 10/2005 | Laigneau et al. |
| 2005/0241489 A1 | 11/2005 | Kirschner et al. |
| 2005/0266122 A1 | 12/2005 | Franceschi |
| 2005/0287251 A1 | 12/2005 | Lazaris et al. |
| 2006/0107841 A1 | 5/2006 | Schifferle |
| 2006/0174773 A1 | 8/2006 | Taylor |
| 2006/0236871 A1 | 10/2006 | Ternite et al. |
| 2006/0292012 A1 | 12/2006 | Brudevold et al. |
| 2007/0186784 A1 | 8/2007 | Liverani et al. |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2008/0264267 A1 | 10/2008 | Doglioni Major |
| 2009/0007783 A1 | 1/2009 | Vanderstraeten |

(56) References Cited

U.S. PATENT DOCUMENTS

| | | | |
|---|---|---|---|
| 2009/0007792 A1 | 1/2009 | Glucksman et al. | |
| 2009/0007793 A1* | 1/2009 | Glucksman | B65D 85/8043 99/287 |
| 2009/0175986 A1 | 7/2009 | DoglioniMajer | |
| 2009/0220650 A1 | 9/2009 | Ozanne | |
| 2010/0005973 A1 | 1/2010 | Doglioni Majer | |
| 2010/0006205 A1 | 1/2010 | McCowin et al. | |
| 2010/0024658 A1 | 2/2010 | Jacobs et al. | |
| 2010/0028495 A1 | 2/2010 | Novak et al. | |
| 2010/0043644 A1 | 2/2010 | Suggi Liverani et al. | |
| 2010/0043645 A1 | 2/2010 | Suggi Liverani et al. | |
| 2010/0064899 A1 | 3/2010 | Aardenburg | |
| 2010/0072268 A1 | 3/2010 | Johnson et al. | |
| 2010/0239733 A1 | 9/2010 | Yoakim et al. | |
| 2010/0239734 A1 | 9/2010 | Yoakim | |
| 2010/0260895 A1 | 10/2010 | Yoakim et al. | |
| 2010/0288131 A1 | 11/2010 | Kilber et al. | |
| 2010/0303964 A1 | 12/2010 | Beaulieu et al. | |
| 2011/0030563 A9 | 2/2011 | DoglioniMajer | |
| 2011/0076361 A1 | 3/2011 | Peterson et al. | |
| 2011/0097450 A1 | 4/2011 | Kruger | |
| 2011/0151075 A1 | 6/2011 | Peterson | |
| 2011/0200726 A1 | 8/2011 | Tinkler et al. | |
| 2011/0212225 A1 | 9/2011 | Mariller | |
| 2011/0226343 A1 | 9/2011 | Novak et al. | |
| 2011/0274802 A1 | 11/2011 | Rivera | |
| 2012/0006205 A1 | 1/2012 | Vanni | |
| 2012/0070544 A1 | 3/2012 | Van der Veen et al. | |
| 2012/0118166 A1 | 5/2012 | Macchi | |
| 2012/0258210 A1 | 10/2012 | Wong et al. | |
| 2012/0258219 A1 | 10/2012 | Wong et al. | |
| 2012/0258221 A1 | 10/2012 | Wong et al. | |
| 2012/0263833 A1 | 10/2012 | Wong et al. | |
| 2012/0308688 A1 | 12/2012 | Peterson et al. | |
| 2012/0318810 A1 | 12/2012 | Hodge et al. | |
| 2012/0321756 A1 | 12/2012 | Estabrook et al. | |
| 2013/0059039 A1 | 3/2013 | Trombetta et al. | |
| 2013/0101716 A1 | 4/2013 | Beaulieu et al. | |
| 2014/0072675 A1 | 3/2014 | Norton et al. | |
| 2014/0072677 A1 | 3/2014 | Hansen | |

FOREIGN PATENT DOCUMENTS

| | | | |
|---|---|---|---|
| CA | 2701826 | | 1/2009 |
| DE | 2029552 | | 12/1971 |
| DE | 3432339 | | 3/1986 |
| EP | 0272922 | | 6/1988 |
| EP | 0334571 | | 9/1989 |
| EP | 0334572 | | 9/1989 |
| EP | 0451980 | | 10/1991 |
| EP | 0455337 | | 11/1991 |
| EP | 0524464 | | 1/1993 |
| EP | 0554469 | | 8/1993 |
| EP | 0615921 | | 9/1994 |
| EP | 0638486 | | 2/1995 |
| EP | 1042978 | | 10/2000 |
| EP | 1208782 | | 5/2002 |
| EP | 1255685 | | 11/2002 |
| EP | 1580143 | * | 3/2004 |
| EP | 1440644 | | 7/2004 |
| EP | 1440913 | | 7/2004 |
| EP | 1440914 | | 7/2004 |
| EP | 1529739 | | 5/2005 |
| EP | 1580143 A1 | | 9/2005 |
| EP | 1792849 | | 6/2007 |
| EP | 2119640 | | 11/2009 |
| EP | 2230195 | | 9/2010 |
| EP | 2239212 A1 | | 10/2010 |
| EP | 2284102 | | 2/2011 |
| EP | 2287090 | | 2/2011 |
| EP | 2404844 | | 1/2012 |
| EP | 2476633 A1 * | 7/2012 | B65D 85/8043 |
| FR | 2946854 | | 12/2010 |
| GB | 838829 | | 6/1960 |
| GB | 2023086 | | 12/1979 |
| GB | 2488799 | | 9/2012 |
| GB | 2489409 | | 10/2012 |
| GB | 2491154 | | 11/2012 |
| JP | 2000355375 | | 12/2000 |
| JP | 2001061663 | | 3/2001 |
| JP | 2005525146 | | 8/2005 |
| JP | 2006521246 | | 9/2006 |
| JP | 2007530108 | | 11/2007 |
| JP | 2009517158 A | | 4/2009 |
| WO | 0158786 | | 8/2001 |
| WO | 0160219 | | 8/2001 |
| WO | 0160220 | | 8/2001 |
| WO | 2001060712 | | 8/2001 |
| WO | 2002058522 | | 8/2002 |
| WO | 02074143 | | 9/2002 |
| WO | 02074661 | | 9/2002 |
| WO | 02082962 | | 10/2002 |
| WO | 03059778 | | 7/2003 |
| WO | 2003073896 | | 9/2003 |
| WO | 2004006740 | | 1/2004 |
| WO | 2004083071 | | 9/2004 |
| WO | 2006008243 A1 | | 1/2006 |
| WO | 2006030461 | | 3/2006 |
| WO | 2007072020 | | 3/2007 |
| WO | 20070072020 | | 6/2007 |
| WO | 2007095294 | | 8/2007 |
| WO | 2007122144 | | 11/2007 |
| WO | 2008116818 | | 10/2008 |
| WO | 2008136026 | | 11/2008 |
| WO | 2009110783 | | 9/2009 |
| WO | 2009115475 | | 9/2009 |
| WO | 2010038213 | | 4/2010 |
| WO | 2010046923 | | 4/2010 |
| WO | 2010085824 | | 8/2010 |
| WO | 2010093246 | | 8/2010 |
| WO | 2010106516 | | 9/2010 |
| WO | 2010115970 | | 10/2010 |
| WO | 2010126365 A1 | | 11/2010 |
| WO | 2010128844 | | 11/2010 |
| WO | 2010134036 | | 11/2010 |
| WO | 2010137952 A1 | | 12/2010 |
| WO | 2010139575 A1 | | 12/2010 |
| WO | 2012122329 | | 9/2012 |
| WO | 2012127233 | | 9/2012 |
| WO | 2012160342 | | 11/2012 |
| WO | 2010138563 | | 12/2012 |

OTHER PUBLICATIONS

Great Britain Search Report dated Jul. 6, 2011 in GB1103953.4 (3 pgs.).

Chinese Patent Office, First Office Action dated Dec. 26, 2014, from corresponding Chinese Patent Application 201280012231.3, 5 pages.

Chinese Patent Office, Second Office Action dated Jul. 2, 2015, from corresponding Chinese Patent Application 201280012231.3, 6 pages.

Russian Patent Office, Office Action dated Mar. 4, 2016, from corresponding Russian Patent Application No. 2013144826, 6 pages.

Japanese Patent Office, Office Action dated Sep. 13, 2016, from corresponding Japanese Patent Application No. 2013-557845, 7 pages.

Chinese Patent Office, Third Office Action dated Jan. 21, 2016, from corresponding Chinese Patent Application 201280012231.3, 12 pages.

Japanese Patent Office, Office Action dated Dec. 1, 2015, from corresponding Japanese Patent Application 2013-557845, 9 pages.

Japanese Patent Office, Office Action dated May 2, 2017, from corresponding Japanese Patent Application No. 2013-557845, 2 pages.

Japanese Patent Office, Office Action, dated Dec. 5, 2017, from corresponding Japanese Patent Application No. 2017-004499, 8 pages.

(56) References Cited

OTHER PUBLICATIONS

Japanese Patent Office, Office Action dated Dec. 19, 2017, from corresponding Japanese Patent Application No. 2013-557845, 11 pages.

\* cited by examiner

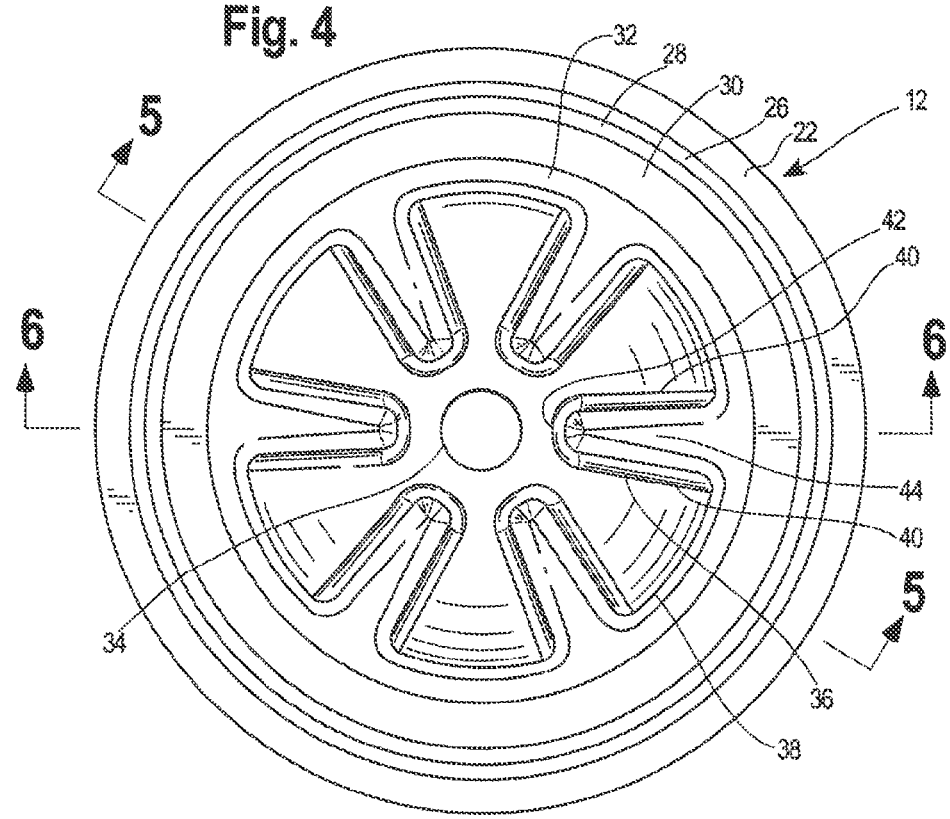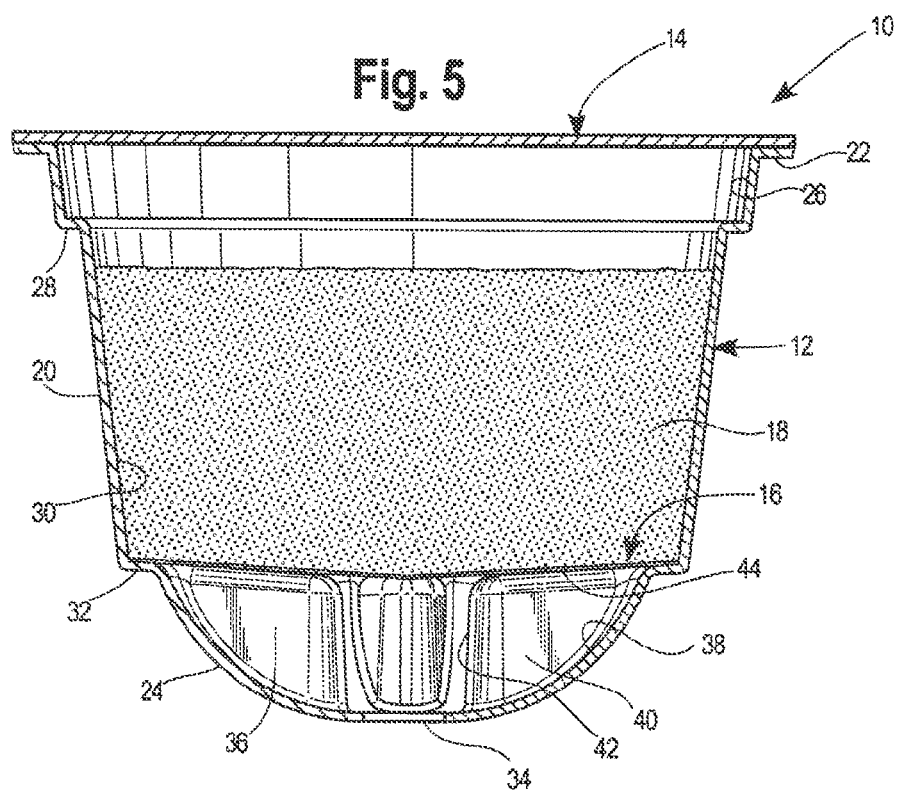

BEVERAGE DELIVERY POD AND METHODS OF USE AND MANUFACTURE

CROSS-REFERENCE TO RELATED APPLICATIONS

This application is a U.S. national phase application of International Application No. PCT/US2012/028185, filed Mar. 8, 2012, designating the United States, which claims benefit from Great Britain Application No. GB 1103953.4, filed Mar. 8, 2011 and U.S. Application No. 61/450,548, filed Mar. 8, 2011, all of which are hereby incorporated herein by reference in their entirety.

FIELD

A beverage delivery pod is described herein and, in particular, a sealed beverage delivery pod containing one or more ingredients for the preparation of beverages.

BACKGROUND

Single serve beverage brewing systems can have a brewing machine configured to receive a filtered pod containing a single serving portion of one or more beverage ingredients, such as coffee or tea. The brewing machine can be configured in pass heated water through the pod to form and dispense a beverage therefrom. A machine can be configured to pierce the top of the pod to inject water into the pod, as well as to pierce the bottom of the pod to permit the beverage to exit the pod. The piercing of the pods for both the injection of water and the exiting of the beverage may not be desirable for all applications.

Beverage pods can be constructed from a variety of different materials and in a variety of different manners, not all of which lead to cost-effective manufacture and disposal and not all of which are suitable for use in different beverage brewing systems. Some beverage pods, for example, can require complex manipulations of internal elements during assembly. Other beverage pods can require complicated internal, injection molded components. Beverage pods are also known to be made with materials that can undesirably add to their cost.

SUMMARY

A pod containing one or more beverage ingredients is provided, where the pod comprises a generally rigid outer member with an open top and an outlet opening in the bottom, with an internal filter adjacent a bottom portion of the outer member, one or more beverage ingredients disposed above the filter, and a lid closing the open top. The outer member has an outer peripheral sidewall, which can be generally annular, defining the open top and extending downwardly from the open top toward the bottom portion and inwardly converging toward the outlet opening. The bottom portion of the sidewall defines a plurality of ribs extending inwardly in the interior of the outer member toward the outlet opening. Beverage outlet flow paths are disposed between adjacent ribs and directed toward the outlet opening. The filter, which may be substantially planer, is supported above the outlet opening and the beverage outlet flow paths by the ribs.

In order to facilitate attachment of the filter, the sidewall includes an inward step about its periphery substantially coplanar with a top surface portion of the ribs to define an attachment surface to which the filter can be attached, such as by using an adhesive or by welding. While a large attachment surface can simplify attachment of the filter, if too large then more area of filter will be blocked, thereby decreasing the free flow area. In one aspect, the filter attached to the attachment surface has a ratio of free flow area to blocked flow area of between about 3:1 and 4:1, more preferably between about 3.2:1 and 3.7:1, and even more preferably about 3.4:1.

To increase the surface area of the filter, including the free flow area, the filter may be in a conical, including truncated conical, configuration, whether facing upwardly or downwardly. This can be accomplished by configuring the top surface portions of the ribs to extend inwardly toward the outlet opening at an inclination such that the area of the attachment surface is larger than if the top surfaces of the ribs, and the filter thereon, were precisely coplanar.

The bottom portion of the sidewall can have a semi-circular or dome-shaped profile, which can be defined at least in part by curvilinear bottom walls of the outlet flow paths. The outlet flow paths can also be bounded by upstanding, interior sidewall segments disposed on opposite sides of each of the bottom walls. Those same sidewall segments can also form sidewall segments of the adjacent ribs.

The bottom portion of the sidewall, including if it is semi-circular or dome-shaped in profile, can be configured such that, in use, the pod is at least partially received in a brewing compartment of a beverage brewing device in a position for dispensing a beverage where the bottom portion of the sidewall is spaced from an upstanding piercing element of the brewing compartment. That is, the bottom portion of the sidewall does not have to be pierced to dispense a beverage. In one aspect, the height of the bottom portion is between about 20% and 30% of the total height of the pod, and more preferably about 25% of the total height of the pod. In another aspect, the outlet opening can be surrounded by a substantially planar segment of the sidewall. A ratio between the diameter of the substantially planar segment to a maximum diameter of sidewall adjacent the beverage ingredient compartment can be between about 1:3.7 and 1:4.7.

The materials used to form the beverage delivery pod can be selected to facilitate economical manufacture and/or recyclability. In one aspect, the lid can be formed on a non-metallic, multi-layer film. By omitting the metallic layer, the lid can more readily be removed from the outer member to empty remaining beverage ingredients after use and recycle the lid and/or the outer member. In another aspect, the outer member can be formed of a corn-based, biodegradable material. In yet another aspect, the lid and/or the outer member can be formed of materials lacking enhanced barrier properties. Instead, one or more pods can be provided within outer packaging, such as a flexible wrapper, which can provide greater barrier properties, as compared to the barrier properties of the lid and/or outer member of the pod.

A method of dispensing a beverage made from the beverage ingredients in any of the pods described herein is also provided. The method includes inserting the pod into a brew compartment of a beverage brewing device, forming an opening in the lid, and injecting an aqueous medium into the beverage ingredient compartment of the pod through the opening in the lid whereby the aqueous medium interacts with the one or more beverage ingredients to form a beverage. The method further includes filtering the beverage through the filter followed by dispensing the beverage from the beverage delivery pod through the outlet opening. The method includes optionally providing the pod with the outlet opening in an unblocked configuration prior to the step of inserting it into the brew compartment, such that a resultant beverage can exit the pod without requiring the bottom portion of the outer member to be pierced.

A method of manufacturing any of the beverage delivery pods described herein is also provided. The method can include providing the outer member, inserting the filter into the outer member, attaching the filter to the ribs in the bottom portion of the outer member and to at least substantially a peripheral portion of the sidewall surrounding the ribs, depositing the one or more beverage ingredients into the outer member above the filter, and attaching the lid to the outer member above the one or more beverage ingredients to close the beverage ingredient compartment.

BRIEF DESCRIPTION OF THE DRAWINGS

FIG. 4 is a top plan view of the outer member of the beverage delivery pod of FIG. 1;

FIG. 5 is a cross-sectional elevation view of the beverage delivery pod of FIG. 1, taken along line 5-5 as indicated on FIG. 4 (with the lid, beverage ingredient, and filter omitted for clarity) and showing the lid, beverage ingredient, filter and curvilinear walls defining in part the outlet flow paths;

DETAILED DESCRIPTION

Figure 1:
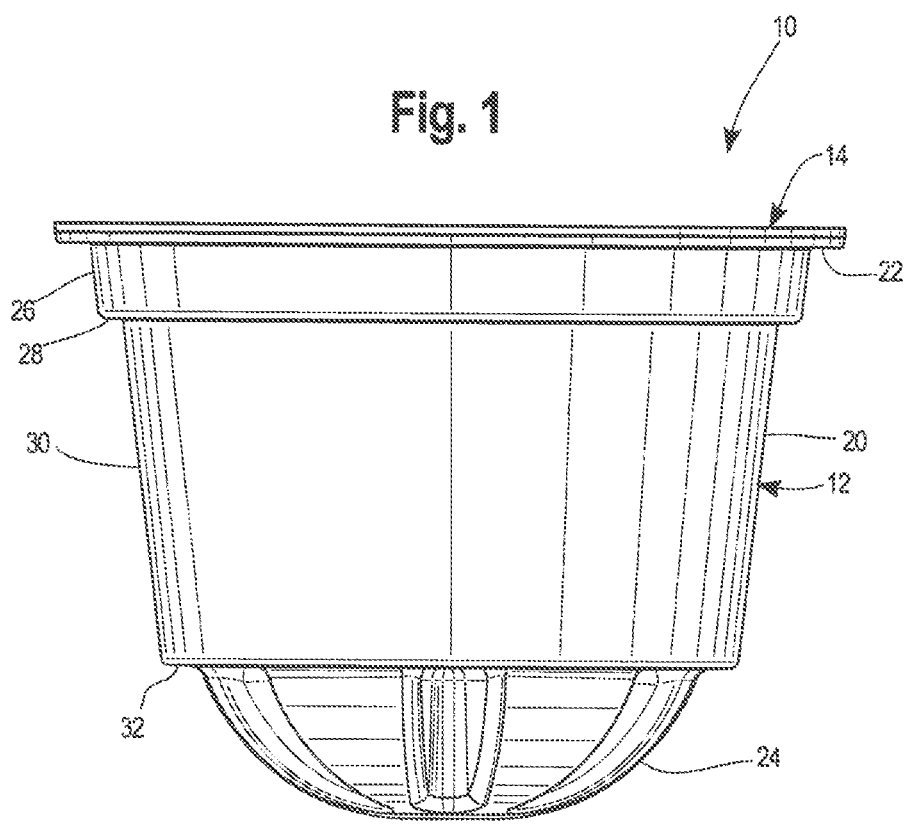
FIG. 1 is a side elevation view of a beverage delivery pod, showing an outer member with an attached lid.

The beverage delivery pod 10 generally comprises outer member 12 for containing one or more beverage ingredients 18, a filter 16 supported in a bottom portion of the outer member 12, and a lid 14 closing a top portion of the outer member 12, as illustrated in whole or in part in FIGS. 1-7. In use, the beverage delivery pod 10 is configured to have its lid 14 pierced to form an opening through which an aqueous medium, typically water, is introduced. The one or more beverage ingredients can be, for example, roast and ground coffee or leaf tea. Other exemplary beverage ingredients include liquid coffee, chocolate or combinations thereof. The aqueous medium mixes with the one or more beverage ingredients 18 in the pod 10 to form a beverage which is passed through the filter 16 and dispensed through an outlet opening 34 disposed in the bottom portion of the outer member 12.

Figure 7:
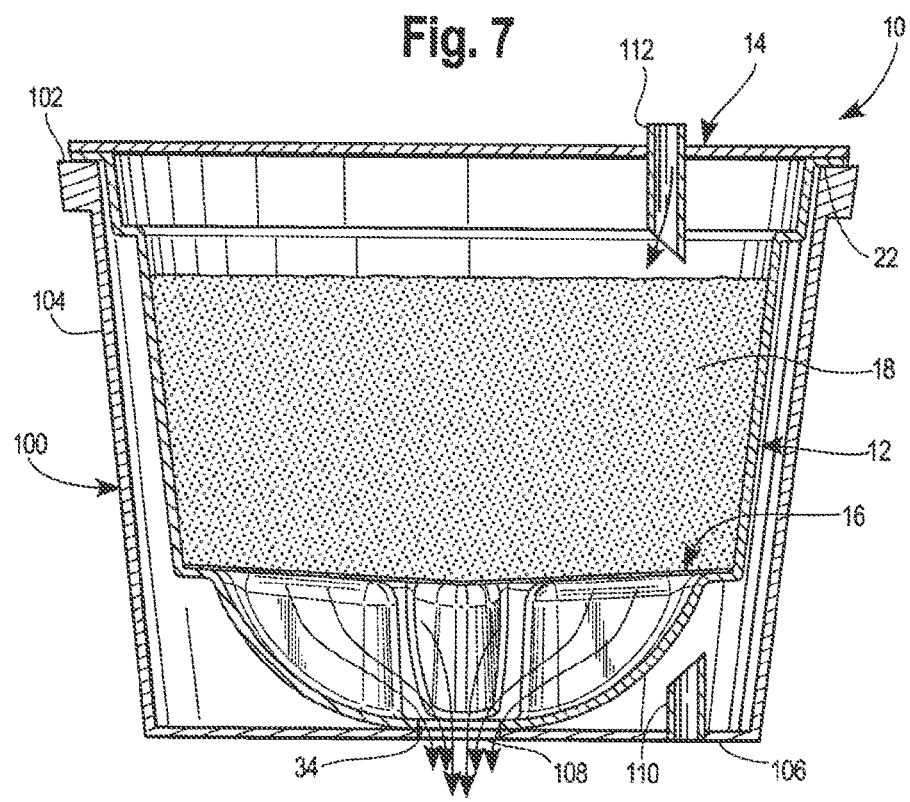
FIG. 7 is a cross-section elevation view of the beverage delivery pod similar to that of FIG. 5, but showing the pod disposed in a brew compartment of a beverage brewing device and with the bottom portion of the outer member being spaced from a bottom piercing element of the brew compartment.

The beverage delivery pod 10 of the exemplary embodiment is configured to permit dispensing of the beverage without requiring the outer member 12 to be pierced. Instead, the beverage is permitted flow out of the outlet opening 34 disposed in the bottom portion of the outer member 12, as depicted in FIG. 7. The beverage delivery pod 10 of the exemplary embodiment is also configured to facilitate manufacturing, including providing the conical filter 16 which is supported in an elevated position above the outlet opening 34. The beverage delivery pod 10 of the exemplary embodiment is further configured to use reduced-cost components which can be readily recyclable.

Turning first to the configuration of the beverage delivery pod 10, the outer member 12 is generally in the shape of an annular cup, as depicted in FIGS. 1-4. The outer member 12 includes an outer sidewall 20 which forms the radially-outward boundary of the beverage delivery pod 10 as well as the bottom portion thereof. The sidewall includes a peripheral flange 22 extending radially outward from a top edge of an upper segment 26 of the sidewall 20, as depicted in FIG. 1, and surrounding an open top of the pod 10. The peripheral flange 22 provides a surface against which the perimeter portion of the lid 14 is sealed. The diameter is reduced at an inwardly extending upper step 28 positioned at a lower edge of the upper segment 26 of the sidewall 20. A middle segment 30 of the sidewall 20 extends downwardly from a radially-inward edge of the upper step 28 to an outward edge of a lower step 32. The lower step 32 is at the transition of the sidewall 20 from the middle segment 30 to a lower, dome-shaped bottom portion 24 which represents the bottom of the outer member 12.

Both the upper segment 26, middle segment 30 and the bottom portion 24 are continuously tapered inwardly, with the taper of the upper and middle segments 26 and 30 being substantially constant and the taper of the bottom portion 24 increasing, such that the diameter of the outer member 12 and thus the pod 10 decreases from top to bottom. Such a tapered configuration can facilitate withdrawal of the outer member 12 from a mold during formation, as well as facilitating insertion and location within a beverage machine. The steps 28 and 32 can function to increase the hoop strength of the outer member 12, thereby permitting the thickness and therefore the amount of material used to form the outer member 12 to be minimized. One or both of the steps 28 and 32 can also facilitate location and support during filling operations.

Figure 2:
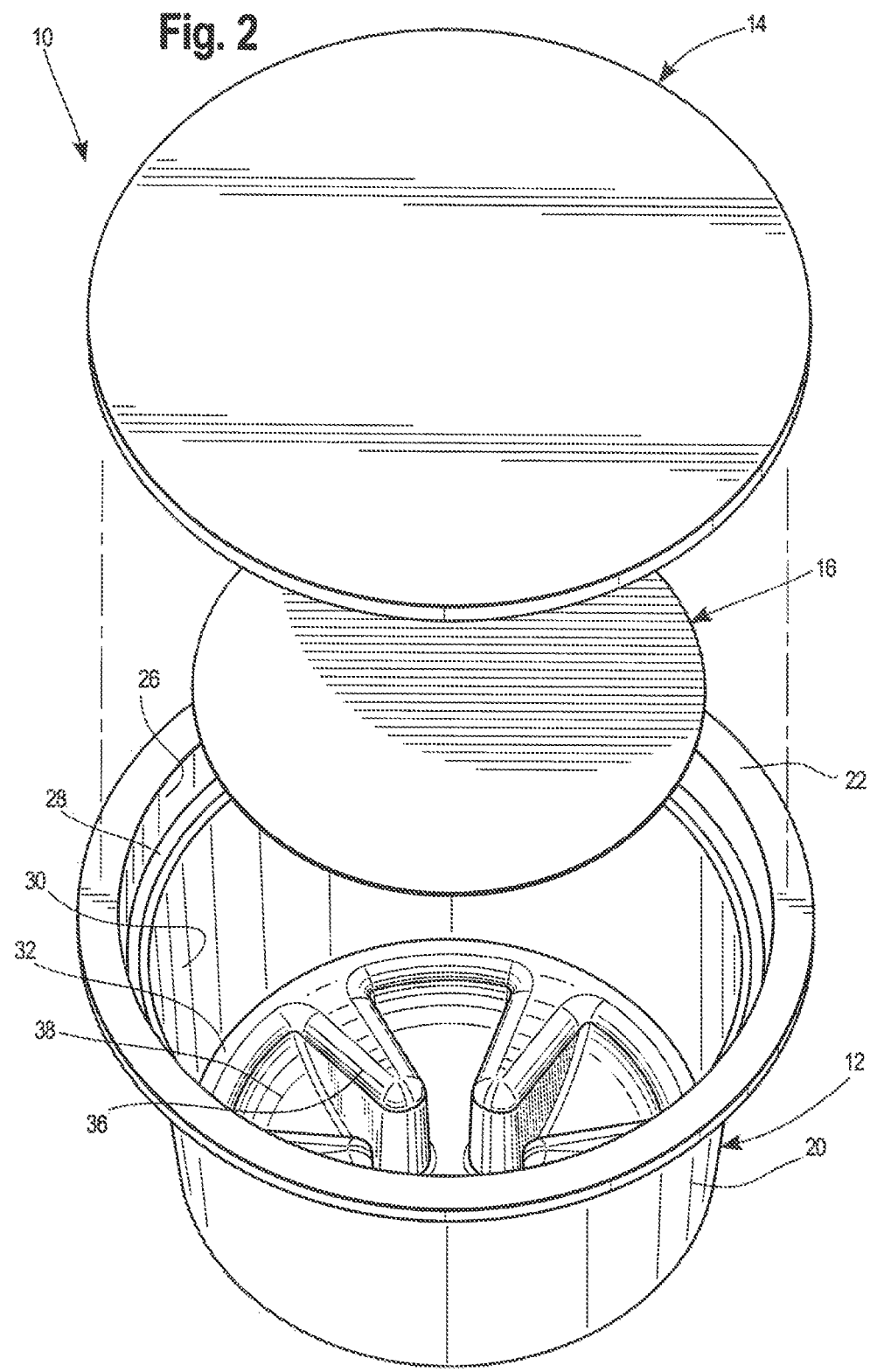
FIG. 2 is an exploded perspective view of the beverage delivery pod of FIG. 1, showing the lid, an internal filter and the outer member, with the beverage ingredient omitted.
Figure 3:
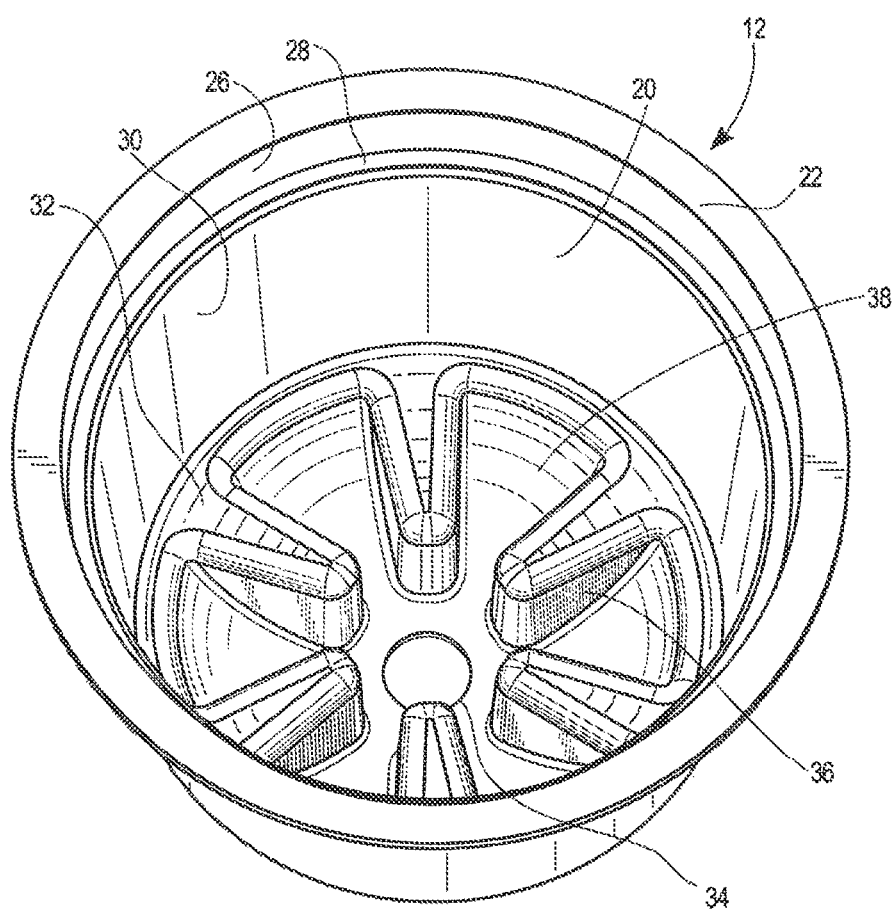
FIG. 3 is a perspective view of the outer member of the beverage delivery pod of FIG. 1, showing inwardly extending, raised ribs in the interior of a bottom portion of the outer member with outlet flow paths therebetween directed toward an outlet opening.
Figure 6:
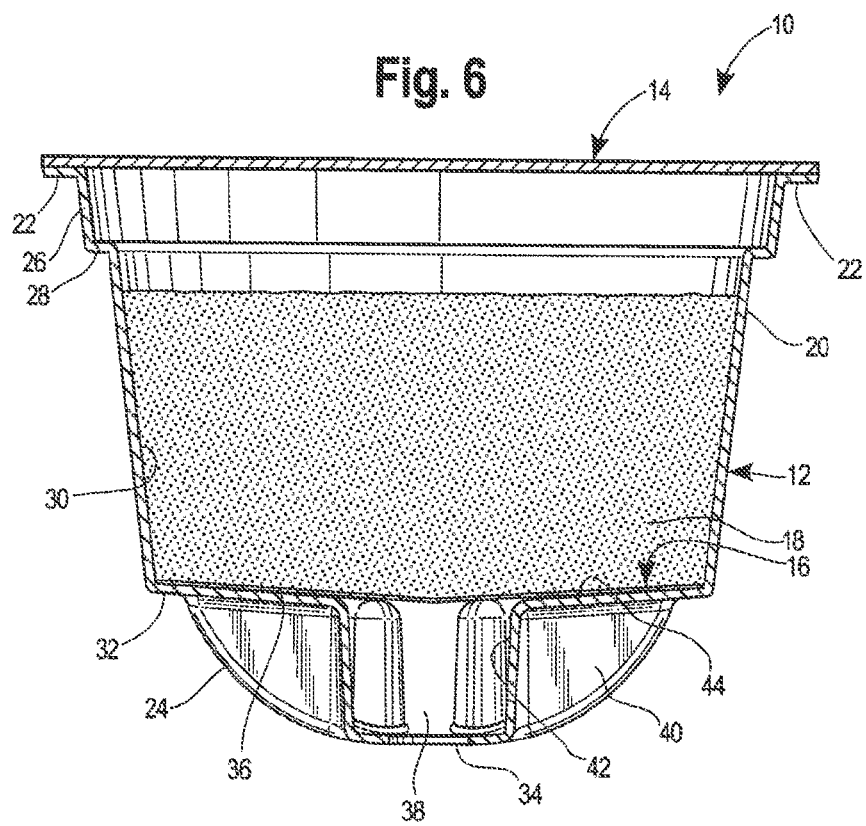
FIG. 6 is a cross-sectional elevation view of the beverage delivery pod of FIG. 1, taken along line 6-6 as indicated on FIG. 4 (with the lid, beverage ingredient, and filter omitted for clarity) and showing the lid, beverage ingredient, filter and ribs.

The bottom portion 24 of the sidewall 20 of the outer member 12 includes a plurality of raised, inwardly extending ribs 36, as depicted in FIGS. 2-4. The ribs 36 surround the outlet opening 34, as depicted in FIG. 4. Disposed between the ribs 36 are flow channels which define at least in part outlet flow paths through which, in use, the beverage can pass through downstream of the filter 16 during flow toward the outlet opening 34. The ribs 36 and interspersed flow channels are with reference to the interior of the outer member 12. When viewed from the exterior, the ribs 36 appear to be grooves and the boundaries of the flow channels appear to be protruding elements separated by the grooves. Although six ribs 36 and flow channels are depicted in the figures, other numbers could be used, such as two or preferably three or more ribs and a corresponding number of flow channels.

The ribs 36 begin at an inward edge of the lower step 32 and are each defined by a pair of inwardly extending sidewall segments 40 and an inward front wall 42, as depicted in FIG. 4. Each of the ribs 38 also has a substantially planar top surface 44. The top surfaces 44 of the ribs 36 are substantially coplanar with the inner-facing surface of the lower step 32, such that the inner-facing surface of the lower step 32 forms a ring around the ribs 36, for purposes that will be described below.

The flow channels also begin at the inward edge of the lower step 32 and are each bounded on their bottom by a curvilinear bottom wall 38 and on their sides by the same sidewall segments 40 as define adjacent ribs 36. The curvilinear bottom walls 38 function to guide the beverage passing through the filter toward the outlet opening 34 is a generally smooth manner, e.g., free of obstructions or changes in direction of flow. The flow channels are each directed to a common space disposed about the outlet opening 34, where the flows can collide and combine to form one or more streams of beverage exiting the outlet opening 34, as illustrated in FIG. 7. Ones of the curvilinear bottom walls 38 combine to provide the dome-shaped appearance of the bottom portion 24 of the sidewall 20 of the outer member 12, such as when viewed in side elevation, as depicted in FIG. 1.

The inner-facing surface of the lower step 32 and the top surfaces 44 of the ribs 36 cooperate to form a substantially flat surface to which the filter 16 can be adhered. At least part of the substantially flat surface acts as an attachment surface, which is the portion to which the filter 16 is attached in a manner that impedes flow through the filter at the attachment surface. The adherence can be accomplished using an adhesive, welding or other suitable ways of attachment. The attachment to the inner-facing surface of the lower step 32 is preferably substantially continuous, and more preferably completely continuous, so that most if not all of the beverage has to pass through the filter 16 before exiting through the outlet opening 34. The top surfaces 44 of the ribs 36 can help to support the filter 16 in an elevated position above the outlet opening 34 to provide a sufficiently dispersed area of the filter 16 such that the beverage passes through more of the unattached surface area of the filter 16 as opposed to being highly concentrated in a region immediately above or adjacent to the outlet opening 34, as could result if the filter were unsupported inwardly of the lower step 32. However, the attachment surface can block fluid flow through the immediately adjacent portion of the filter 16. This attachment surface is preferably minimized to a degree such that there still remains the vast majority of the surface area of the filter 16 free from attachment, i.e., unblocked by the attachment surface, while still providing for sufficient support to maintain the filter 16 in its elevated position during the pressurization and filtration during dispensing of a beverage. In a preferred embodiment, the filter 16 has a ratio of free flow area to blocked flow area of between about 3:1 and 4:1, more preferably between about 3.2:1 and 3.7:1, and even more preferably about 3.4:1. A larger unblocked surface area can result in reduced pressure requirements for forcing the beverage through the filter.

In order to increase the unblocked surface area of the filter 16, the filter 16 can be in a conical arrangement. That is, the center portion of the filter 16 is not precisely coplanar with the outer periphery thereof, but could be conical, including truncated conical, in shape. For example, the filter 16 can have an angle of inclination toward its center portion of between about 10 and 15 or 20 degrees, more preferably between about 20 and 40 degrees, and, in an exemplary embodiment, even more preferably about 30 degrees. The filter 16 could have a height less than its diameter. For instance, an angle of inclination of 30 degrees in a filter having a diameter of 37 mm can increase the total area of the filter 16 from 1007 $mm^2$ if precisely planar to 1165 $mm^2$. While the conical shape can either be directed upwardly or downwardly to increase the surface area, it is preferred that the conical shape of the filter 16 be directed downwardly toward the outlet opening 34. The filter could alternatively be substantially planar.

In order to achieve the conical shape of the filter 16, the top surfaces 44 of the ribs 36 can be slightly inclined, either upwardly or downwardly, at the same or generally the same angle of inclination as is desired for the filter 16. Furthermore, the top surfaces 44 of the ribs 36 can be inwardly tapered or narrowed such that there is lesser support or blocked surface area of the filter 16 toward its center portion, which is where the beverage will tend to exit.

Turning now to details of the material and construction of the components of the beverage delivery pod 10, the outer member 12 in the exemplary embodiment is of thin walled, generally rigid construction. By generally rigid, what is meant is that the structure has the ability to generally retain its respective shape during normal handling, and if deformed will tend to return toward its original shape. The outer member 12 is preferably formed of a biodegradable polymer material, such as a corn-based material. Suitable materials include degradable polyethylene (for example, SPITEK supplied by Symphony Environmental, Borehamwood, United Kingdom), biodegradable polyester amide (for example, BAK 1095 supplied by Symphony Environmental), poly lactic acids (PLA supplied by Cargill, Minn., USA), starch-based polymers, cellulose derivatives and polypeptides.

The filter 16 is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinyl chloride and/or polyethylene. The incorporation of these plastic materials into the cellulosic material renders the cellulosic material heat-sealable to the surface portions 44 of the ribs 36 and the inner-facing surface of the lower step 32. The filter 16 may also be treated or coated with a material which is activated by heat and/or pressure so that it can be sealed to the attachment surfaces.

The lid 14 is preferably a multi-layer film, made from one or more polypropylene (PP) or filled polypropylene layers and a polyethylene terephthalate (PET) layer. In one example, the lid 14 can have the following layers: PP (about 25 microns), filled PP (about 60 microns), PP (about 25 microns) and PET (about 23 microns). Preferably, though not necessarily, the lid 14 is free of metallic layers, such as an aluminum foil layer. This can permit the lid 14 to be more readily removed from attachment to the flange 22 of the sidewall 20 of the outer member 12 without leaving metallic remnants behind. This can permit the lid 14 to be removed from the outer member 12 after use, the contents dumped or otherwise removed, and the outer member 12 ready to be recycled.

Both the lid 14 and the outer member 12 can lack traditional barrier layers. Elimination of the barrier layers can reduce the costs of the components. In order to provide the barrier properties for suitable shelf life of the beverage delivery pods 10, outer packaging for one or groups of two or more of the pods 10 can be provided, such as an outer wrapper, which may be in the form of a flow wrapped film.

The beverage delivery pod 10 can be configured for use in a beverage brewing device having a brew compartment 100 defined by an outer wall 104, as illustrated in FIG. 7. The peripheral flange 22 of the outer member 12 of the pod 10 can be supported on an upper part 102 of the outer wall 104 of the brew compartment 100. The pod 10 can be configured such that it is not pierced by a bottom piercing member 110 of a bottom wall 106 of the compartment 100 when fully inserted to a degree sufficient for brewing. The outlet opening 34 of the bottom part 24 of the sidewall 20 of the outer member 12 is preferably open, e.g., it does not require piercing. While it can be completely open, it also can be initially closed, such as with a label that can be removed prior to insertion in the brew compartment 100 or a dissolvable plug disposed in the pod 10 to block the outlet opening 34 until dissolved by the dispensing beverage, heat or other present, non-mechanical factors.

A method of dispensing a beverage made from the beverage ingredients in any of the pods described herein is also provided. The method includes inserting the pod 10 into a brew compartment 100 of a beverage brewing device, forming an opening in the lid 14, such as by using an inlet piercer 112, and injecting an aqueous medium into the beverage ingredient compartment of the pod 10 through the opening in the lid 14 and the inlet piercer 112, whereby the aqueous medium interacts with the one or more beverage ingredients 18 to form a beverage. The method further includes filtering the beverage through the filter 16 followed by dispensing the beverage from the beverage delivery pod 16 through the outlet opening 34 and into the brew compartment 100, and from the brew compartment 100 through an outlet 108 thereof. The method includes optionally providing the pod 10 with the outlet opening 34 in an unblocked configuration prior to the step of inserting it into the brew compartment 100, such that a resultant beverage can exit the pod 10 without requiring the bottom portion of the outer member 12 to be pierced, such as by a piercer 110 associated with the bottom 106 of the brew compartment 100.

A method of manufacturing any of the beverage delivery pods 10 described herein is also provided. The method can include providing the outer member 12, inserting the filter 16 into the outer member 12, attaching the filter 16 to the ribs 36 in the bottom portion of the outer member and to at least substantially a peripheral portion of the inner-facing surface of the lower step 32 surrounding the ribs 36, depositing the one or more beverage ingredients 18 into the outer member 12 above the filter 16, and attaching the lid 14 to the outer member 12 above the one or more beverage ingredients 18 to close the beverage ingredient compartment.

From the foregoing, it will be appreciated that beverage delivery pods, methods of use and methods of manufacture are provided. However, numerous modifications and variations could be made thereto by those skilled in the art without departing from the scope of the description herein and as set forth in the claims.

The invention claimed is:

1. A pod containing one or more beverage ingredients, the pod comprising:
   a generally rigid outer member having an outer peripheral sidewall defining an open top and extending downwardly from the open top toward a bottom portion and inwardly converging toward an outlet opening, the bottom portion of the sidewall having a dome-shaped profile and defining a plurality of ribs extending inwardly in an interior of the outer member toward the outlet opening;
   the outer member including beverage outlet flow paths disposed between adjacent ribs in an interior of the outer member and directed toward the outlet opening, a filter supported above the outlet opening and the beverage outlet flow paths by the plurality of ribs;
   the bottom portion of the sidewall including a planar segment surrounding the outlet opening and curvilinear bottom wall portions having an arcuate shape extending from the filter to the planar segment surrounding the outlet opening;
   each of the ribs of the outer member defining a groove in an exterior of the outer member and having a pair of sidewall segments spaced apart from each other that define at least a portion of the groove therebetween in the exterior of the outer member, wherein the beverage outlet flow paths in the interior of the outer member are each defined in part by sidewall segments of adjacent ribs in the interior of the outer member and one of the curvilinear bottom wall portions;
   a lid attached to the sidewall of the outer member to close the open top to form a beverage ingredient compartment bounded in part by the lid and the filter, the lid being pierceable to accommodate an inflow of an aqueous medium into the beverage ingredient compartment; and
   one or more beverage ingredients disposed in the beverage ingredient compartment.

2. The pod as claimed in claim 1, wherein the sidewall includes an inward step about its periphery substantially coplanar with a top surface portion of the ribs to define an attachment surface to which the filter is attached.

3. The pod as claimed in claim 2, wherein the filter attached to the attachment surface has a ratio of free flow area to blocked flow area of between about 3:1 and 4:1.

4. The pod as claimed in claim 3, wherein the top surface portions of the ribs extend inwardly toward the outlet opening at a slight inclination such that the area of the attachment surface is larger than if the top surface portions of the ribs were precisely coplanar.

5. The pod as claimed in claim 3, wherein the filter attached to the attachment surface has a ratio of free flow area to blocked flow area of between about 3.2:1 and 3.7:1.

6. The pod as claimed in claim 5, wherein the filter attached to the attachment surface has a ratio of free flow area to blocked flow area of about 3.4:1.

7. The pod as claimed in claim 1, wherein the dome-shaped profile is defined by the curvilinear bottom portions.

8. The pod as claimed in claim 7, wherein the dome-shaped profile has a height of between about 20% and 30% of the total height of the pod.

9. The pod as claimed in claim 8, wherein the bottom portion of the sidewall is configured, such that, in use, the pod is at least partially received in a brewing compartment of a beverage brewing device in a position for dispensing a beverage where the bottom portion of the sidewall is spaced from an upstanding piercing element of the brewing compartment.

10. The pod as claimed in claim 9, wherein the sidewall includes an upper annular portion above the bottom portion and having a maximum outer diameter, and the substantially planar segment of the sidewall has an outer diameter, a ratio between the outer diameter of the substantially planar segment to the maximum outer diameter of the upper annular portion of the sidewall being between about 1:3.7 and 1:4.7.

11. The pod as claimed in claim 10, wherein the lid is a non-metallic, multi-layer film.

12. The pod as claimed in claim 11, wherein the outer member is formed of a corn-based, biodegradable material.

13. The pod as claimed in claim 12, in combination with an outer flexible wrapper providing greater barrier properties as compared to any barrier properties of the lid and/or outer member of the pod.

14. The pod as claimed in claim 8, wherein the dome-shaped profile has a height of about 25% of the total height of the pod.

15. A method of manufacturing the beverage pod of claim 1, the method comprising:
  providing the outer member;
  inserting the filter into the outer member;
  attaching the filter to the ribs in the bottom portion of the outer member and to at least a peripheral portion of the sidewall surrounding the ribs;
  depositing the one or more beverage ingredients into the outer member above the filter, and attaching the lid to the outer member above the one or more beverage ingredients to close the beverage ingredient compartment.

16. A method of dispensing a beverage made from the beverage ingredients in the pod of claim 1, the method comprising:
  providing the pod with the outlet opening in an unblocked configuration;
  inserting the pod into a brew compartment of a beverage brewing device;
  forming an opening in the lid;
  injecting an aqueous medium into the beverage ingredient compartment of the pod through the opening in the lid whereby the aqueous medium interacts with the one or more beverage ingredients to form a beverage;
  filtering the beverage through the filter, and dispensing the beverage from the beverage delivery pod through the outlet opening.

\* \* \* \* \*